United States Patent
Reyes et al.

(10) Patent No.: US 7,396,795 B2
(45) Date of Patent: Jul. 8, 2008

(54) LOW TEMPERATURE PREPARATION OF SUPPORTED NANOPARTICLE CATALYSTS HAVING INCREASED DISPERSION

(75) Inventors: Clementine Reyes, Lawrenceville, NJ (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 365 days.

(21) Appl. No.: 11/216,442

(22) Filed: Aug. 31, 2005

(65) Prior Publication Data

US 2007/0049488 A1   Mar. 1, 2007

(51) Int. Cl.
   *B01J 31/00* (2006.01)
   *B01J 23/02* (2006.01)
   *B01J 23/00* (2006.01)
   *B01J 23/40* (2006.01)
   *B01J 23/42* (2006.01)

(52) U.S. Cl. .............. 502/150; 502/439; 502/325; 502/326; 502/506; 502/510; 502/162; 502/168; 502/172; 502/159

(58) Field of Classification Search ............ 502/150, 502/325, 439, 510, 506, 326, 159, 162, 168, 502/172
   See application file for complete search history.

(56) References Cited

U.S. PATENT DOCUMENTS

| | | | |
|---|---|---|---|
| 3,992,331 A | 11/1976 | Petrow et al. | |
| 4,007,256 A | 2/1977 | Kim et al. | 423/584 |
| 4,009,252 A | 2/1977 | Izumi et al. | 423/584 |
| 4,028,274 A | 6/1977 | Kunz | 252/447 |

(Continued)

FOREIGN PATENT DOCUMENTS

EP   0864362   9/1998

(Continued)

OTHER PUBLICATIONS

Walter J. Dressick, Charles S. Dulcey, Jacque H. Georger, Jr., Gary S. Calabrese, and Jeffrey M. Calvert, "Covalent binding of Pd Catalysts to Ligating Self-Assembled Monolayer Films for Selective Electroless Metal Deposition" J Electrochem. Soc., vol. 141, No. 1, Jan. 1994, pp. 210-220.*

(Continued)

*Primary Examiner*—Ngoc-Yen M. Nguyen
*Assistant Examiner*—Diana J Liao
(74) *Attorney, Agent, or Firm*—Workman Nydegger

(57) ABSTRACT

Highly dispersed supported catalyst nanoparticles are manufactured at temperatures below about 95° C. The catalyst nanoparticles are formed on a support using an organic anchoring agent. The anchoring agent molecules include at least two functional groups. One functional group is selected to bond with the catalyst atoms and the other functional group is selected to bond with the support material. The anchoring agent and its interaction with the support provide a template for the catalyst atoms. The catalyst nanoparticles are manufactured by treating the support material with a solution of the anchoring agent. A solution of the catalyst atoms is reacted with the anchoring agent molecules to form an intermediate supported catalyst. The supported intermediate catalyst is dried by heating at a temperature less than about 95° C. In an alternative embodiment, the catalyst atoms are reacted with the anchoring agent molecules prior to treating the support material with the anchoring agent.

20 Claims, 2 Drawing Sheets

U.S. PATENT DOCUMENTS

| | | | |
|---|---|---|---|
| 4,064,154 A | 12/1977 | Chandra et al. | 260/448.2 |
| 4,070,401 A | 1/1978 | Hirai et al. | |
| 4,083,803 A | 4/1978 | Oswald et al. | 502/158 |
| 4,128,627 A | 12/1978 | Dyer et al. | 423/584 |
| 4,148,750 A | 4/1979 | Pine | |
| 4,195,003 A | 3/1980 | Hurlock et al. | 524/417 |
| 4,279,883 A | 7/1981 | Izumi et al. | 423/584 |
| 4,313,806 A | 2/1982 | Dalton, Jr. et al. | 205/724 |
| 4,335,092 A | 6/1982 | Dalton, Jr. et al. | 423/584 |
| 4,336,238 A | 6/1982 | Dalton, Jr. et al. | 423/584 |
| 4,336,239 A | 6/1982 | Dalton, Jr. et al. | 423/584 |
| 4,336,240 A | 6/1982 | Moseley et al. | |
| 4,347,231 A | 8/1982 | Michaelson | 423/584 |
| 4,347,232 A | 8/1982 | Michaelson | |
| 4,366,085 A | 12/1982 | Ikegami et al. | |
| 4,369,128 A | 1/1983 | Moseley et al. | 502/169 |
| 4,379,778 A | 4/1983 | Dalton, Jr. et al. | 423/584 |
| 4,476,242 A | 10/1984 | Puskas et al. | 502/185 |
| 4,503,160 A | 3/1985 | Williams, Jr. | 502/158 |
| 4,513,098 A | 4/1985 | Tsao | |
| 4,581,344 A | 4/1986 | Ledoux et al. | |
| 4,661,337 A | 4/1987 | Brill | 423/584 |
| 4,681,751 A | 7/1987 | Gosser | 423/584 |
| 4,701,428 A | 10/1987 | Bellussi et al. | 502/8 |
| 4,713,363 A | 12/1987 | Hucul | 502/262 |
| 4,760,187 A | 7/1988 | Kosak | |
| 4,772,458 A | 9/1988 | Gosser et al. | 423/584 |
| 4,824,976 A | 4/1989 | Clerici et al. | 549/531 |
| 4,826,795 A | 5/1989 | Kitson et al. | 502/184 |
| 4,832,938 A | 5/1989 | Gosser et al. | |
| 4,889,705 A | 12/1989 | Gosser | 423/584 |
| 4,937,216 A | 6/1990 | Clerici et al. | 502/62 |
| 4,937,220 A | 6/1990 | Nickols, Jr. | 502/185 |
| 4,983,558 A | 1/1991 | Born et al. | 502/31 |
| 4,996,039 A | 2/1991 | Pralus et al. | 423/584 |
| 5,017,535 A | 5/1991 | Schoonhoven | 502/30 |
| 5,024,905 A | 6/1991 | Itoh et al. | 429/44 |
| 5,061,671 A | 10/1991 | Kitson et al. | |
| 5,096,866 A | 3/1992 | Itoh et al. | 502/101 |
| 5,104,635 A | 4/1992 | Kanada et al. | 423/584 |
| 5,128,114 A | 7/1992 | Schwartz | |
| 5,132,099 A | 7/1992 | Hiramatsu et al. | |
| 5,135,731 A | 8/1992 | Gosser et al. | 423/584 |
| 5,166,372 A | 11/1992 | Crocco et al. | 549/531 |
| 5,169,267 A | 12/1992 | Cowper | 406/49 |
| 5,169,618 A | 12/1992 | Maraschino | 423/584 |
| 5,180,573 A | 1/1993 | Hiramatsu et al. | 423/584 |
| 5,194,242 A | 3/1993 | Paoli | 423/584 |
| 5,214,168 A | 5/1993 | Zajacek et al. | 549/531 |
| 5,234,584 A | 8/1993 | Birbara et al. | 210/181 |
| 5,235,106 A | 8/1993 | Didillon et al. | |
| 5,236,692 A | 8/1993 | Nagashima et al. | 423/584 |
| 5,320,821 A | 6/1994 | Nagashima et al. | 423/584 |
| 5,338,531 A | 8/1994 | Chuang et al. | |
| 5,352,645 A | 10/1994 | Schwartz | |
| 5,362,405 A | 11/1994 | Birbara et al. | 210/763 |
| 5,372,981 A | 12/1994 | Witherspoon | |
| 5,378,450 A | 1/1995 | Tomita et al. | 423/584 |
| 5,391,531 A | 2/1995 | Ward | 502/208 |
| 5,399,334 A | 3/1995 | Kawakami et al. | 423/584 |
| 5,399,344 A | 3/1995 | Yang et al. | 424/84 |
| 5,447,706 A | 9/1995 | Van Weynbergh et al. | 423/584 |
| 5,460,734 A | 10/1995 | Birbara et al. | 210/763 |
| 5,480,629 A | 1/1996 | Thompson et al. | |
| 5,496,532 A | 3/1996 | Monzen et al. | |
| 5,505,921 A | 4/1996 | Luckoff et al. | 423/584 |
| 5,580,839 A | 12/1996 | Huffman et al. | |
| 5,583,085 A | 12/1996 | Ward | 502/232 |
| 5,608,112 A | 3/1997 | Schwartz | |
| 5,641,467 A | 6/1997 | Huckins | 423/584 |
| 5,641,723 A | 6/1997 | Bonnemann et al. | |
| 5,679,858 A | 10/1997 | Langer et al. | |
| 5,698,488 A | 12/1997 | Birbara et al. | 502/325 |
| 5,767,036 A | 6/1998 | Freund et al. | 502/185 |
| 5,846,895 A | 12/1998 | Gila et al. | |
| 5,846,898 A | 12/1998 | Chuang et al. | |
| 5,851,948 A | 12/1998 | Chuang et al. | 502/314 |
| 5,859,265 A | 1/1999 | Muller et al. | |
| 5,900,386 A | 5/1999 | Freund et al. | |
| 5,912,367 A | 6/1999 | Chang | 549/529 |
| 5,925,588 A | 7/1999 | Chuang et al. | |
| 5,939,220 A | 8/1999 | Gunner et al. | |
| 5,961,948 A | 10/1999 | Wanngard | |
| 5,962,365 A | 10/1999 | Langer et al. | |
| 5,962,741 A | 10/1999 | Baumeister et al. | |
| 5,965,101 A | 10/1999 | Goto et al. | 423/584 |
| 5,972,305 A | 10/1999 | Park et al. | |
| 6,005,155 A | 12/1999 | Sun | 585/640 |
| 6,042,804 A | 3/2000 | Huckins | 423/584 |
| 6,054,507 A | 4/2000 | Funaki et al. | |
| 6,090,858 A | 7/2000 | El-Sayed | |
| 6,106,797 A | 8/2000 | Muller et al. | 423/584 |
| 6,117,409 A | 9/2000 | Bertsch-Frank et al. | 423/584 |
| 6,159,267 A | 12/2000 | Hampden-Smith | 75/252 |
| 6,168,775 B1 | 1/2001 | Zhou et al. | |
| 6,194,338 B1 | 2/2001 | Andolfatto et al. | 502/101 |
| 6,210,651 B1 | 4/2001 | Nystrom et al. | 423/584 |
| 6,239,054 B1 | 5/2001 | Shukis et al. | |
| 6,284,213 B1 | 9/2001 | Paparatto et al. | 423/403 |
| 6,294,696 B1 | 9/2001 | Didillon et al. | |
| 6,299,852 B1 | 10/2001 | Nystrom et al. | 423/584 |
| 6,307,073 B1 | 10/2001 | Jones | 549/532 |
| 6,316,673 B2 | 11/2001 | Giera et al. | |
| 6,331,500 B1 | 12/2001 | Tsuji et al. | 502/63 |
| 6,375,920 B2 | 4/2002 | Fischer et al. | 423/584 |
| 6,387,346 B1 | 5/2002 | Bertsch-Frank et al. | 423/584 |
| 6,447,743 B1 | 9/2002 | Devic et al. | 423/584 |
| 6,500,968 B2 | 12/2002 | Zhou et al. | 549/531 |
| 6,500,969 B1 | 12/2002 | Zhou et al. | 549/531 |
| 6,504,040 B1 | 1/2003 | Vogtel et al. | 549/525 |
| 6,518,217 B2 | 2/2003 | Xing et al. | 502/230 |
| 6,528,683 B1 | 3/2003 | Heidemann et al. | |
| 6,534,440 B2 | 3/2003 | Choudhary et al. | 502/333 |
| 6,534,661 B1 | 3/2003 | Zhou et al. | 549/531 |
| 6,551,960 B1 | 4/2003 | Laine et al. | |
| 6,576,214 B2 | 6/2003 | Zhou et al. | 423/584 |
| 6,630,118 B2 | 10/2003 | Paparatto et al. | 423/584 |
| 6,635,348 B1 | 10/2003 | Hampden-Smith et al. | 428/402 |
| 6,649,140 B2 | 11/2003 | Paparatto et al. | 423/584 |
| 6,676,919 B1 | 1/2004 | Fischer et al. | |
| 6,713,036 B1 | 3/2004 | VandenBussche et al. | 423/584 |
| 6,740,615 B2 | 5/2004 | Zhou | |
| 6,746,597 B2 | 6/2004 | Zhou et al. | |
| 6,764,671 B2 | 7/2004 | Haas et al. | 423/584 |
| 6,768,013 B1 | 7/2004 | Pujado | 549/532 |
| 6,815,391 B2 | 11/2004 | Xing et al. | |
| 6,872,377 B2 | 3/2005 | Fischer et al. | 423/584 |
| 6,888,013 B2 | 5/2005 | Paparatto et al. | 549/532 |
| 6,908,873 B2 | 6/2005 | Zhou et al. | |
| 6,953,822 B2 | 10/2005 | Locken et al. | 524/460 |
| 7,011,807 B2 | 3/2006 | Zhou et al. | 423/584 |
| 7,045,479 B2 | 5/2006 | Zhou et al. | 502/125 |
| 7,048,905 B2 | 5/2006 | Paparatto et al. | 423/584 |
| 7,060,244 B2 | 6/2006 | Devic | 423/584 |
| 2001/0024634 A1 | 9/2001 | Bertsch-Frank et al. | 423/583 |
| 2003/0104936 A1 | 6/2003 | Mao et al. | |
| 2003/0180212 A1 | 9/2003 | Huckins | 423/584 |
| 2003/0215383 A1 | 11/2003 | Escrig et al. | 423/584 |
| 2004/0013601 A1 | 1/2004 | Butz et al. | 423/584 |
| 2004/0037770 A1 | 2/2004 | Fischer et al. | |
| 2004/0081611 A1 | 4/2004 | Muller et al. | 423/584 |
| 2004/0087441 A1 | 5/2004 | Bock et al. | |
| 2004/0101718 A1 | 5/2004 | Cao et al. | |
| 2004/0126312 A1 | 7/2004 | Butz et al. | 423/584 |

| | | | | | | |
|---|---|---|---|---|---|---|
| 2004/0151659 | A1 | 8/2004 | Paparratto et al. ........... 423/584 | WO | WO 02/092501 | 11/2002 |
| 2004/0151660 | A1 | 8/2004 | Paparratto et al. ........... 423/584 | WO | WO 02/092502 | 11/2002 |
| 2004/0184983 | A1 | 9/2004 | Paparatto et al. ........... 423/584 | WO | WO 03/014014 | 2/2003 |
| 2004/0241502 | A1 | 12/2004 | Chung et al. | WO | WO 2004078740 | 9/2004 |

FOREIGN PATENT DOCUMENTS

| | | |
|---|---|---|
| EP | 0 978 316 | 2/2000 |
| EP | 1 160 195 | 12/2001 |
| EP | 1 160 196 | 12/2001 |
| EP | 1 308 416 | 5/2003 |
| EP | 1 344 747 | 9/2003 |
| GB | 1056125 | 1/1967 |
| JP | 05017106 | 1/1993 |
| JP | 07033410 | 2/1995 |
| JP | 07069604 | 3/1995 |
| JP | 07069605 | 3/1995 |
| JP | 07241473 | 9/1995 |
| JP | 09241009 | 9/1997 |
| JP | 09301705 | 11/1997 |
| JP | 10324507 | 12/1998 |
| JP | 10330103 | 12/1998 |
| JP | 2003010693 | 1/2003 |
| JP | 2003024794 | 1/2003 |
| WO | WO9810863 | 3/1998 |
| WO | WO 00/59635 | 10/2000 |
| WO | WO 01/05501 | 1/2001 |
| WO | WO 02/14217 | 2/2002 |
| WO | WO 02/14299 | 2/2002 |
| WO | WO 02/28527 | 4/2002 |
| WO | WO 02/28528 | 4/2002 |
| WO | WO 02/083550 | 10/2002 |

OTHER PUBLICATIONS

Ahmadi, et al., "Shape-Controlled Synthesis of Colloidal Platinum Nanoparticles" *Science*, vol. 272, pp. 1924-1926 (Jun. 28, 1996).

Lordi, et al., "Method for Supporting Platinum on Single-Walled Carbon Nanotubes for a Selective hydrogenation Catalyst", *Chem. Mater.*, vol. 13, pp. 733-737 (Feb. 10, 2001).

Henglein, et al., "Absorption Spectrum and Some Chemical Reactions of Colloidal Platinum in Aqueous Solution," J. Phys. Chem., 99, 14129-14136 (1995).

Li, et al., "Carbon Nanotubes as Support for Cathode Catalyst of a Direct Methanol Fuel Cell", Letters to the Editor/Carbon 40, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells", J. Phys. Chem, B, vol. 107, pp. 6292-6299 (Jun. 6, 2003).

Petroski, et al., "Kinetically Controlled Growth and Shape Formation Mechanism of Platinum Nanoparticles," J. Phys. Chem. B, 102, 3316-3320 (1998).

Zhou, et al., "Novel Synthesis of Highly Active Pt/C Cathode Electrocatalyst for Direct Methanol Fuel Cell" Chem. Commun. 2003, pp. 394-395.

Zhou, et al. "Preparation and Characterization of Anode Catalysts PtRu/C for Direct Methanol Fuel Cells" Chemical Journal of Chinese Universities, vol. 24, 2003, pp. 885-862.

\* cited by examiner

LOW TEMPERATURE PREPARATION OF SUPPORTED NANOPARTICLE CATALYSTS HAVING INCREASED DISPERSION

BACKGROUND OF THE INVENTION

1. The Field of the Invention

The present invention relates to the manufacture of highly dispersed supported nanoparticles. More particularly, the invention relates to manufacturing processes for making supported nanocatalysts using lower temperature heating to improve and/or maintain dispersion of the supported nanoparticles.

2. Related Technology

Particle catalysts are an important component of many industrial applications such as refining, organic synthesis, fine chemicals manufacturing, and many other industrial processes. In many catalyzed reactions, improving catalyst performance has the potential to greatly improve the profitability and/or viability of an industrial process. In many cases, a precious metal is used as the catalyst. By improving the catalyst performance, costs can be reduced by reducing the amount of catalyst being used and/or by increasing the product yield.

Improved catalyst performance has typically been achieved by reducing the size of the catalyst particles. Particulate catalysts are only active at the surface. Reducing the size of the catalyst particles increases the surface to volume ratio, thereby increasing catalyst performance.

One technique commonly used to obtain small catalyst particles on a support is to begin with the catalyst atoms dissolved in a solvent. The catalyst atoms are usually provided as metal salts due to the solubility of metal salts in various solvents. At some point during the manufacturing process, the catalyst is dried to remove the solvent. To decrease the time it takes to remove the solvent, the intermediate catalyst is often heated to between 100° C. and 400° C.

It is known in the art that heating the catalyst atoms can cause agglomeration of catalyst particles. Some researchers have tried obtaining smaller particle sizes by adsorbing the catalyst atoms onto a support at temperatures below 100° C. However, low temperature drying using prior art methods has not produced significantly better catalysts.

BRIEF SUMMARY OF THE INVENTION

The present invention provides a method for manufacturing finely dispersed supported nanoparticles. The nanoparticle catalysts are manufactured from a solution of catalyst atoms dispersed in a solvent. During preparation of the nanoparticles the catalyst is dried to remove the solvent. The advantages of the present invention are obtained from the combination of (i) bonding the catalyst atoms with an organic anchoring agent and (ii) drying the nanoparticle catalyst at temperatures below about 95° C. The combination of these two features allows formation of nanoparticle catalysts that perform significantly better than catalysts prepared by either method alone.

In a preferred embodiment, the organic anchoring agent includes at least two functional groups. One functional group bonds to the catalyst atoms and the second functional group bonds with a support material. Suitable functional groups for bonding with the catalyst atoms and the support material include one or more of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide.

Preferred organic anchoring agents include one or more of oxalic acid, malic acid, malonic acid, maleic acid, succinic acid, glycolic acid, lactic acid, glucose, citric acid, EDTA, pectins, cellulose, ethanolamine, mercaptoethanol, 2-mercaptoacetate, glycine, sulfobenzyl alcohol, sulfobenzoic acid, sulfobenzyl thiol, sulfobenzyl amine, polyacrylates, polyvinylbenzoates, polyvinyl sulfate, polyvinyl sulfonates, polybisphenol carbonates, polybenzimidizoles, polypyridine, sulfonated polyethylene terephthalate, or combinations thereof.

By dispersing the catalyst atoms with the organic anchoring agent and optionally bonding the organic anchoring agent to the support material, the tendency toward particle agglomeration caused by high surface energies can be at least partially overcome. The benefits of drying the catalysts at low temperatures can be realized when performed in combination with the use of the organic anchoring agent.

These and other advantages and features of the present invention will become more fully apparent from the following description and appended claims as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. INTRODUCTION

Figure 1:
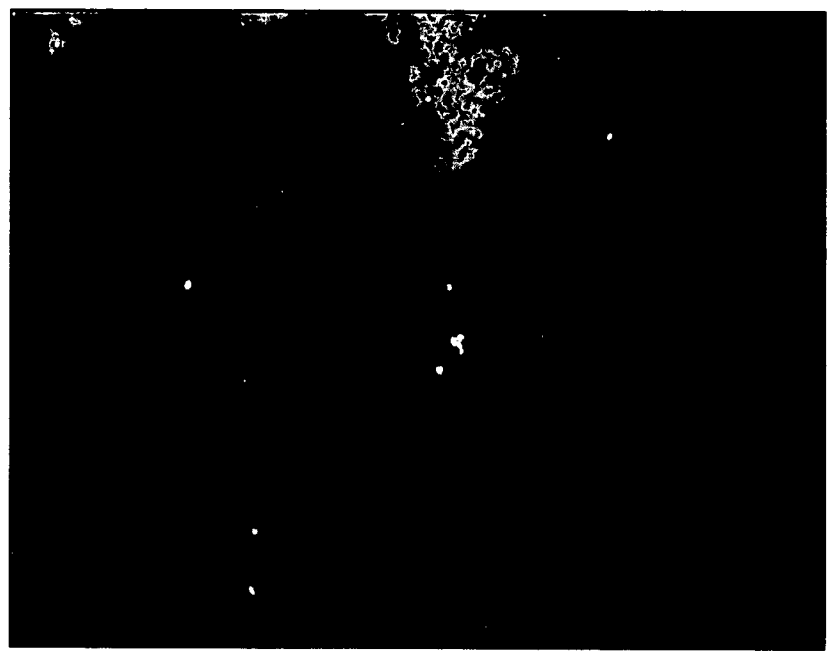
FIG. 1 is a wide view TEM image of a nanocatalyst prepared for comparative purposes using high temperatures.

The present invention is directed to methods for manufacturing highly dispersed catalyst nanoparticles at temperatures below about 95° C. The catalyst nanoparticles are formed on a support using an organic anchoring agent. The anchoring agent molecules include at least two functional groups. One functional group is selected to bond with the catalyst atoms and the other functional group is selected to bond with the support material. The anchoring agent and its interaction with the support provide a template for the catalyst atoms.

According to one embodiment, the catalyst nanoparticles are manufactured by treating the support material with a solution of the anchoring agent. Next, a solution of the catalyst atoms is reacted with the anchoring agent molecules to form an intermediate supported catalyst. The supported intermediate catalyst is dried by heating at a temperature less than about 95° C.

In an alternative embodiment, the catalyst atoms are reacted with the anchoring agent molecules prior to treating the support material with the anchoring agent.

For purposes of the present invention, the term "particle size" refers to average particle size.

II. COMPONENTS USED TO MAKE NANOPARTICLES

A. Catalyst Atoms

Any element or group of elements that can exhibit catalytic activity and bond with the anchoring agent molecules can be used to form catalysts according to the present invention. These include elements or groups of elements that exhibit primary catalytic activity, as well as promoters and modifiers. As the primary catalytic active component, metals are preferred. Exemplary metals can include noble metals, base transition metals, and rare earth metals.

Examples of base transition metals that may exhibit catalytic activity include, but are not limited to, chromium, manganese, iron, cobalt, nickel, copper, zirconium, tin, zinc, tungsten, titanium, molybdenum, vanadium, and the like. These may be used alone, in various combinations with each other, or in combinations with other elements, such as noble metals, alkali metals, alkaline earth metals, rare earth metals, or non-metals.

Examples of noble metals, also referred to as platinum-group metals, that exhibit catalytic activity, include platinum, palladium, iridium, gold, osmium, ruthenium, rhodium, rhenium, and the like. These may be used alone, in various combinations with each other, or in combinations with other elements, such as base transition metals, alkali metals, alkaline earth metals, rare earth metals, or non-metals.

Examples of rare earth metals that exhibit catalytic activity include, but are not limited to, lanthanum and cerium. These may be used alone, in various combinations with each other, or in combinations with other elements, such as base transition metals, noble metals, alkali metals, alkaline earth metals, or non-metals.

Optionally, non-transition metals can also be included, typically as promoters or modifiers. Suitable non-transition metals include alkali metals and alkaline earth metals, such as sodium, potassium, magnesium, calcium, etc., and non-metals such as phosphorus, sulfur, and halides.

B. Anchoring Agents

The organic anchoring agent is selected to promote the formation of nanocatalyst particles that have a desired size, stability, and/or uniformity. Typically the anchoring agent molecules react with the catalyst atoms to form ligands complexed with the catalyst atoms.

Anchoring agents suitable for bonding catalyst atoms include a variety of small organic molecules, polymers and oligomers. The anchoring agent interacts and bonds with catalyst atoms dissolved or dispersed within an appropriate solvent or carrier. Bonding can occur through various suitable mechanisms, including ionic bonding, covalent bonding, Van der Waals interaction/bonding, lone pair electron bonding, or hydrogen bonding.

To provide the bonding between the anchoring agent molecules and the catalyst atoms, the anchoring agent molecules include two or more appropriate functional groups. One functional group is capable of bonding to the catalyst atoms, the other functional group is capable of bonding to the support material.

In one embodiment, the functional groups comprise a carbon atom bonded to at least one electron-rich atom that is more electronegative than the carbon atom and that is able to donate one or more electrons so as to form a bond or attraction with a catalyst atom. Preferred anchoring agents include functional groups which have either a charge or one or more lone pairs of electrons that can be used to complex a metal catalyst atom. These functional groups allow the anchoring agent to have a strong binding interaction with the catalyst atoms.

In an exemplary embodiment, the functional groups of the anchoring agent comprise one or more members selected from the group of a hydroxyl, a carboxyl, a carbonyl, an amine, an amide, a nitrile, a nitrogen with a free lone pair of electrons, an amino acid, a thiol, a sulfonic acid, a sulfonyl halide, and an acyl halide. The anchoring agent can be bifunctional or polyfunctional.

Useful bifunctional anchoring agents include diacids such as oxalic acid, malic acid, malonic acid, maleic acid, succinic acid, and the like; dialcohols such as ethylene glycol, propylene glycol, 1,3-propanediol, and the like; hydroxy acids such as glycolic acid, lactic acid, and the like. Useful polyfunctional anchoring agents include sugars such as glucose, polyfunctional carboxylic acids such as citric acid, EDTA, pectins, cellulose, and the like. Other useful anchoring agents include ethanolamine, mercaptoethanol, 2-mercaptoacetate, amino acids, such as glycine, and sulfonic acids, such as sulfobenzyl alcohol, sulfobenzoic acid, sulfobenzyl thiol, and sulfobenzyl amine. The anchoring agent may even include an inorganic component (e.g., silicon-based).

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

In addition to the characteristics of the anchoring agent, it can also be advantageous to control the molar ratio of anchoring agent to the catalyst atoms in a catalyst suspension. A more useful measurement is the molar ratio between anchoring agent functional groups and catalyst atoms. For example, in the case of a divalent metal ion two molar equivalents of a monovalent functional group would be necessary to provide the theoretical stoichiometric ratio. Typically the molar ratio of anchoring agent functional groups to catalyst atoms is preferably in a range of about 0.001:1 to about 50:1, more preferably in a range of about 0.005:1 to about 10:1, and most preferably in a range of about 0.01:1 to 3:1.

The anchoring agent allows for the formation of very small and uniform nanoparticles. In general, the nanocatalyst particles formed in the presence of the anchoring agent are preferably less than about 20 nm in size. In some cases, the nanocatalyst particles may be atomically dispersed. The nanocatalyst particles more preferably have an average particle size less than about 15 nm and most preferably less than about 10 nm.

Finally, depending on the desired stability of the nanocatalyst particles on the support material, the anchoring agent can be selected to covalently bond with the support material so as to anchor or tether the nanocatalyst particles and/or atoms to the support material. While the anchoring agent has the ability to inhibit agglomeration of the nanocatalyst particles in the absence of anchoring, chemically bonding the nanocatalyst particles to the support material through a ligand is a particularly effective mechanism for preventing agglomeration.

Suitable functional groups for bonding with the support are the same types of functional groups as those suitable for bonding to the catalyst atoms. However, anchoring agent molecules can have different functional groups for bonding to the support and bonding to the catalyst atoms.

C. Solvents and Other Additives

The catalyst atoms are prepared in a solution that can be applied to the support material. The solution can contain various solvents, including water and organic solvents. Solvents participate in catalyst formation by providing a solution for the interaction of catalyst atoms and the anchoring agent molecules. Suitable solvents include water, methanol, ethanol, n-propanol, isopropyl alcohol, acetonitrile, acetone, tetrahydrofuran, ethylene glycol, dimethylformamide, dimethylsulfoxide, methylene chloride, and the like, including mixtures thereof.

The catalyst composition can also include additives to assist in the formation of the nanocatalyst particles. For example, mineral acids and basic compounds can be added, preferably in small quantities (e.g. less than 5 wt %). Examples of mineral acids that can be used include hydrochloric acid, nitric acid, sulfuric acid, phosphoric acid, and the like. Examples of basic compounds include sodium hydroxide, potassium hydroxide, calcium hydroxide, ammonium hydroxide, and similar compounds.

It is also possible to add solid materials to assist in nanoparticle formation. For example, ion exchange resins may be added to the solution during catalyst formation. Ion exchange resins can be substituted for the acids or bases mentioned above. Solid materials can be easily separated from the final catalyst solution or suspension using simple techniques such as centrifugation and filtration. Solid materials can also be added to remove unwanted byproducts. For example, activated carbon is a relatively inexpensive material that can be used to remove some unwanted by-products formed during catalyst preparation.

D. Support Materials

The organically complexed nanocatalyst particles are formed on a support material. The support may be organic or inorganic. It may be chemically inert, or it may serve a catalytic function complementary to the nanocatalyst. The support may be in a variety of physical forms. It may be porous or nonporous. It may be a three-dimensional structure, such as a powder, granule, tablet, or extrudate. The support may be a two-dimensional structure such as a film, membrane, or coating. It may be a one-dimensional structure such as a narrow fiber.

One class of support materials includes porous, inorganic materials, such as alumina, silica, titania, kieselguhr, diatomaceous earth, bentonite, clay, zirconia, magnesia, metal oxides, zeolites, and calcium carbonate. Another useful class of supports includes carbon-based materials, such as carbon black, activated carbon, graphite, fluoridated carbon, and the like. Other supports include polymers and other inorganic solids, metals, and metal alloys.

The nanocatalyst particles can be deposited within a wide range of loadings on the support material. The loading can range from about 0.01% to about 70 wt % of the supported nanocatalyst particles, more preferably in a range of about 0.1% to about 25%. In the case where the support material is porous, it is preferable for the surface area to be at least 20 $m^2/g$, more preferably greater than 50 $m^2/g$.

III. METHODS OF MAKING NANOCATALYST COMPOSITIONS

The process for manufacturing a supported catalyst according to the present invention can be can be broadly summarized as follows. First, one or more types of catalyst atoms (e.g., in the form of a ground state metal or metal salt) and one or more types of anchoring agent molecules (e.g., in the form of a carboxylic acid salt) are selected. Second, a support material is treated with a solution of the anchoring agent molecules. Next, the catalyst atoms are reacted with the anchoring agent molecules to form a supported intermediate catalyst. Finally, the catalyst is dried at a temperature less than about 95° C.

In a preferred embodiment, the support material is treated with the anchoring agent by first preparing a solution of the anchoring agent using an appropriate solvent. The solvent is selected to disperse the anchoring agent molecules on the support material. In a preferred embodiment, the treated support is then dried to remove the solvent. The anchoring agent molecules bond with the support material either upon being dispersed on the support surface or during drying. The anchoring agent molecules on the support serve as a template for the catalyst atoms.

A supported intermediate catalyst is formed by reacting the catalyst atoms with the anchoring agent molecules. To disperse the catalyst atoms on the treated support, the catalyst atoms are dissolved in a suitable solvent. The solution of catalyst atoms is then applied to the treated support and the catalyst atoms react with the anchoring agent molecules to form the intermediate supported catalyst. The dispersed nature of the organic anchoring agent molecules on the support provides a similar dispersion for the catalyst atoms.

The intermediate supported catalyst is then dried to remove the solvent. The temperature during drying is maintained below about 95° C. to reduce agglomeration of the catalyst atoms into large particles. In a more preferred embodiment, the temperature is maintained below about 80° C., even more preferably below about 65° C., and most preferably below about 50° C. Drying the catalyst at low temperatures has been found to form and/or maintain extremely small catalyst particles. It is believed that the anchoring agent molecules are able to inhibit agglomeration of catalyst nanoparticles at low temperatures by reducing the surface energy of the nanoparticles and/or by bonding with the support surface. The drying rate can be increased without increasing temperature through vacuum drying techniques known in the art.

In an alternative embodiment, the order in which the anchoring agent is applied to the support and reacted with the catalyst atoms can be reversed. In this embodiment, the catalyst atoms are reacted with the anchoring agent before being applied to the support material. This embodiment can be useful where improved dispersion is obtained by first forming the bond between the catalyst atoms and the anchoring agent molecules. For example, in some cases, it may be desirable for the functional group that needs to react with the catalyst atoms to be reacted with the catalyst atoms without being exposed to the functional groups on the support material.

In some cases, the catalyst atoms are also subjected to a reduction step to activate the catalyst atoms. Typically the catalyst is heated during reduction to temperatures above about 50° C. However, since the solvent has been removed prior to this step and since the catalyst is in a reducing environment, the nanocatalyst can withstand higher temperatures without agglomerating than is possible during the drying portion of the manufacturing process.

During catalyst preparation, some agglomeration of catalyst atoms generally occurs, thereby forming nanoparticles. In some cases, formation of nanoparticles is desirable so as to create a particular crystal lattice. The size of catalyst formation can be controlled in part by the temperature allowed during preparation of the nanocatalyst. For example, if atomically dispersed catalyst atoms are desired, temperatures at or below 25° C. are preferred. For formation of nanoparticles having an average particles size of between 1 nm and 20 nm, the temperature during drying is preferably maintained below about 65° C. In a preferred embodiment the nanoparticles have an average size less than about 20 nm, more preferably less than about 15 nm, and most preferably less than about 10 nm.

During formation of the catalyst nanoparticles, some or most of the anchoring agent molecules can be removed from the catalyst atoms to allow the catalyst atoms to become catalytically active. For example, during a reduction step some of the anchoring agent molecules may be removed. However, in a preferred embodiment at least some of the anchoring agent molecules remain to bond the nanoparticles to the support. In addition, it can be preferable to select an anchoring agent that will cause the catalyst atoms to crystallize to form nanoparticles having a desired crystal face exposure. Examples of anchoring agents that yield supported catalyst particles having a predominantly (111) crystal face exposure are disclosed in U.S. Pat. No. 6,746,597. Examples of anchoring agents that yield supported catalyst particles having a predominantly (110) crystal face exposure are disclosed in U.S. Patent Publication No. 2005/0014635. For purposes of disclosing how to select an anchoring agent in order to yield supported nanocatalyst particles having a desired crystal face exposure, the foregoing U.S. patent and published U.S. application are incorporated by reference.

IV. EXAMPLES

The following examples provide formulas for making catalyst. Example 1 is a method for making a catalyst using high temperatures and is provided for comparative purposes. Examples 2 and 3 are prepared using the methods described above.

Comparative Example 1

Pd/C Catalyst Preparation with High Temperature

Example 1 describes a method for preparing a palladium catalyst on carbon using high temperatures. First, 10 g of activated carbon (550 m$^2$/g surface area), was placed in a glass vessel, evacuated for 1 hour, and then soaked in 200 ml of methanol for 2 hours at room temperature with continuous stirring. The methanol was then decanted off. An aqueous solution of sodium polyacrylate was prepared by combining 1.25 g of sodium polyacrylate (1200 MW) and water to a total volume of 150 ml. The sodium polyacrylate solution was then added to the carbon. The solution and carbon were then placed in a rotating drier apparatus under an infrared heat lamp until dry. During drying, the temperature ranged from 100 to 200° C. The dried solid was then washed by first mixing with 250 ml of cold water, followed by filtering. The solid was further washed by mixing with 250 ml of warm water, followed by filtering. The resulting treated carbon was then dried in an oven for 2 hours at 80° C.

A palladium chloride solution was prepared by dissolving 0.1 g of PdCl$_2$ in 250 ml of water. The pH of this solution was adjusted to 2 before being added to 6 g of the treated support suspended in 50 ml of water. The liquid/solid mixture was then placed in the rotating drier apparatus under the infrared heat lamp until dry. During drying, the temperature ranged from 100 to 200° C. The dried solid was then washed, first by mixing with 250 ml of cold water followed by filtering, then by mixing with 250 ml of warm water followed by filtering. The filtrate from the warm water wash was checked for free chloride by addition of a few drops of silver nitrate, which in the presence of chlorine gives a white precipitate. If any free chlorine was observed, additional warm water washes were conducted until no free chlorine was observed. The washed solid was then dried for 2 hours at 80° C., after which the catalyst was ready for use.

Figure 2:
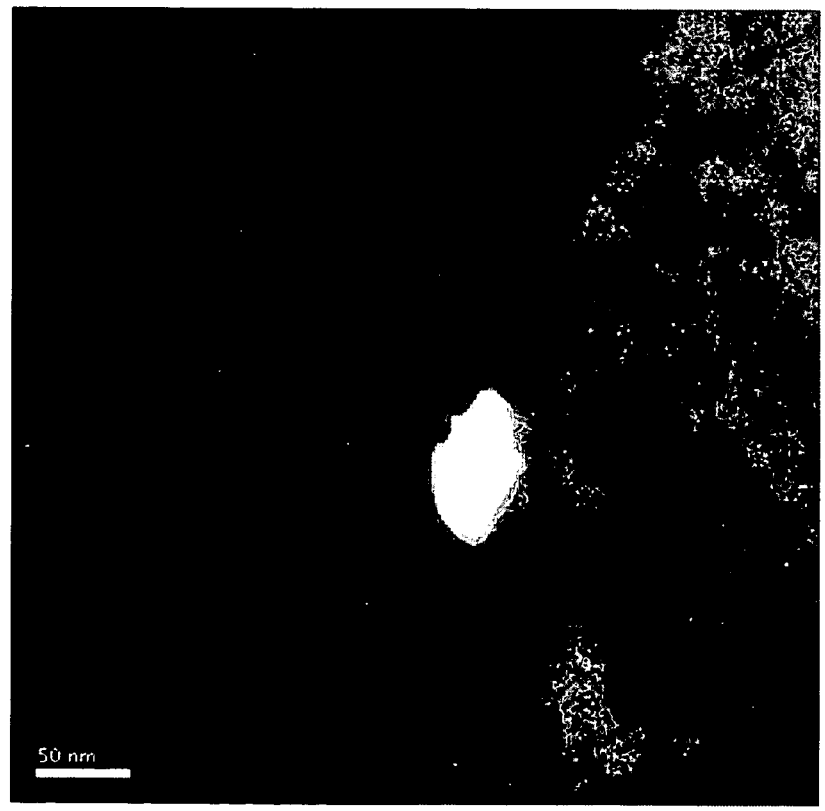
FIG. 2 is a high resolution TEM image of the nanocatalyst of FIG. 1.

The finished catalyst from Comparative Example 1 was analyzed by transmission electron microscopy. FIG. 1 shows a wide view TEM image of the catalyst, which contains a scattering of relatively large particles, ranging from 60 to 160 nm in diameter. As shown in FIG. 2, higher magnification also revealed that smaller particles of approximately 20 nm diameter were also present.

Example 2

Pd/C Catalyst Preparation According to Present Invention

Example 2 describes a method for preparing a nanoparticle catalyst on carbon using low temperatures according to the present invention. The palladium nanoparticle catalyst on carbon was prepared by first washing 10 g of activated carbon (surface area of 550 m$^2$/g). The carbon was placed in a glass reactor, evacuated for 1 hour, and soaked in 200 ml of methanol for 2 hours at room temperature with continuous stirring. The methanol was then decanted off. An aqueous solution of sodium polyacrylate was prepared by combining 1.25 g of sodium polyacrylate (1200 MW) with water to a total volume of 150 ml. The sodium polyacrylate solution was then added to the carbon. The mixture was then stirred overnight at room temperature, followed by filtering to recover the treated carbon. The treated carbon was then washed, first by mixing with 250 ml of cold water followed by filtering, then by mixing with 250 ml of warm water followed by filtering. The treated carbon support was then dried under vacuum and then in an oven for 2 hours at 65° C.

A palladium chloride solution was prepared by dissolving 0.1 g of PdCl$_2$ in 250 ml of water. The pH of the PdCl$_2$ solution was adjusted to 2 before being added to 6 g of the treated carbon suspended in 50 ml of water. The mixture was stirred for 30 minutes, after which a colorless supernatant was observed. The resulting intermediate supported catalyst was then filtered. The solid was then washed, first by mixing with 250 ml of cold water followed by filtering, then by mixing with 250 ml of warm water followed by filtering. The filtrate from the warm water wash was checked for free chloride by addition of a few drops of silver nitrate. Warm water washes were conducted until no free chlorine was observed. No leaching of metal was observed during washing. The intermediate supported catalyst was then dried by vacuum and then in an oven at 65° C. for 2 hours, after which the catalyst was ready for use.

Figure 3:
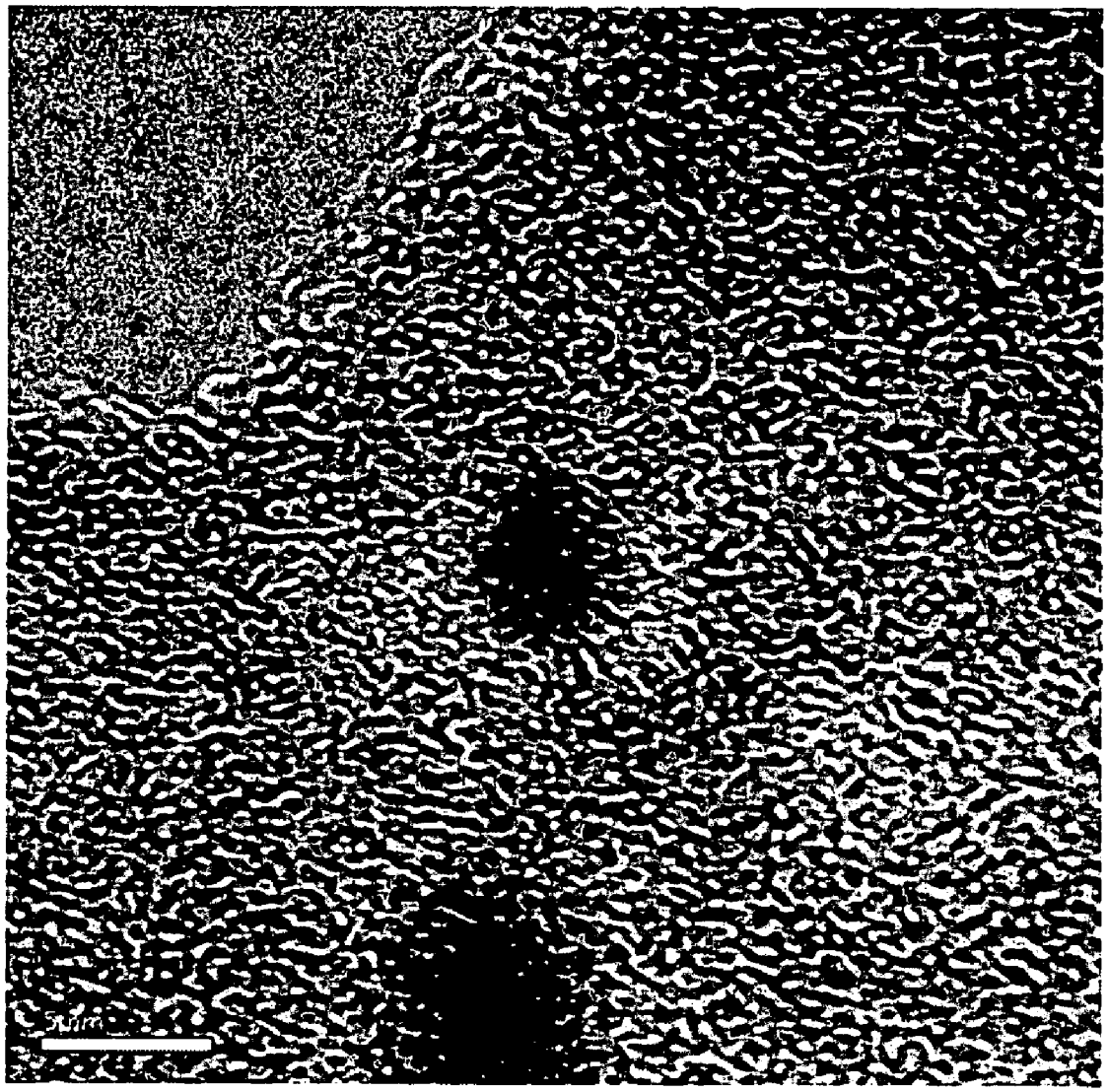
FIG. 3 is a high resolution TEM image of a nanocatalyst prepared using low temperatures according to the methods of the present invention.

The finished catalyst of Example 2 was analyzed by transmission electron microscopy. As shown in FIG. 3, the catalyst was found to contain a uniform dispersion of particles with sizes of 5 nm±2 nm.

Example 3

Pt/C Catalyst Preparation According to Present Invention

Example 3 describes a method for preparing a nanoparticle catalyst on carbon using low temperatures according to the present invention. The palladium nanoparticle catalyst on carbon was prepared by first washing 10 g of activated carbon with a surface area of 550 m$^2$/g. The carbon was placed in a glass reactor, evacuated for 1 hour, and soaked in 200 ml of methanol for 2 hours at room temperature with continuous stirring. The methanol was then decanted off.

An aqueous solution of sodium polyacrylate was prepared by combining 2.5 g of sodium polyacrylate (1200 MW) with water to a total volume of 150 ml. The sodium polyacrylate solution was then added to the carbon. The mixture was then stirred overnight at room temperature, followed by filtering to recover the treated carbon. The treated carbon was then washed, first by mixing with 250 ml of cold water followed by filtering, then by mixing with 250 ml of warm water followed by filtering. The treated carbon support was then dried under vacuum and then in an oven for 2 hours at 65° C.

A palladium chloride solution was prepared by dissolving 0.1 g of $PdCl_2$ in 250 ml of water. The pH of the $PdCl_2$ solution was adjusted to 2 before being added to 6 g of the treated carbon suspended in 50 ml of water. The mixture was stirred for 30 minutes, after which a colorless supernatant was observed. The resulting intermediate supported catalyst was then filtered. The solid was then washed, first by mixing with 250 ml of cold water followed by filtering, then by mixing with 250 ml of warm water it followed by filtering. The filtrate from the warm water wash was checked for free chloride by addition of a few drops of silver nitrate. Additional warm water washes were conducted until no free chlorine was observed. No leaching of metal was observed during washing. The intermediate supported catalyst was then dried by vacuum and then in an oven at 65° C. for 2 hours, after which the catalyst was ready for use.

Example 4-6

Use of Catalyst in Suzuki Reaction

In examples 4-6, palladium on carbon catalysts were prepared according to the methods of Examples 1-3, respectively. The catalysts were then tested in a Suzuki reaction. Specifically, p-chloro phenyl bromide was reacted with phenyl boronic acid according to the following formula:

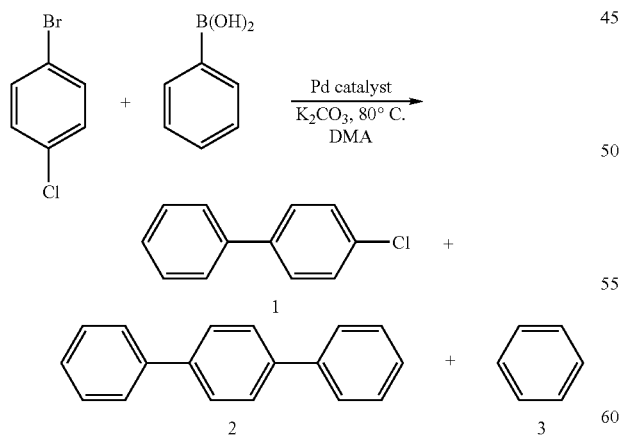

This reaction generally produces major product 1 and side reaction products 2 and 3. The reactions were all stopped before reaching completion to show the difference in activity and yield. The results are shown in Table 1 below.

TABLE 1

| Example # | Catalyst | Pd mmoles | Time (hrs) | % starting material | % 1 | % 2 | % 3 | % Conv. |
|---|---|---|---|---|---|---|---|---|
| 4 | 1% Pd/C Catalyst of Comparative Example 1 | 0.0001 | 1 | 96.4 | 0 | 0 | 3.6 | 57.6% |
| | | | 2 | 96.1 | 0.8 | 0 | 3.0 | |
| | | | 3 | 90.0 | 7.1 | 0 | 2.8 | |
| | | | 4 | 81.9 | 13.9 | 0 | 4.2 | |
| | | | 5 | 79.0 | 17.6 | 0 | 3.4 | |
| | | | 6 | 75.1 | 20.5 | 0 | 4.4 | |
| | | | 7 | 69.7 | 28.0 | 0 | 2.3 | |
| | | | 21 | 42.4 | 55.2 | 0 | 2.4 | |
| 5 | 1% Pd/C Catalyst of Example 2 | 0.0001 | 1 | 92.4 | 2.9 | 0 | 4.7 | 76.0% |
| | | | 3 | 73.0 | 21.8 | 0 | 5.1 | |
| | | | 5 | 60.0 | 36.4 | 0 | 3.6 | |
| | | | 7 | 50.4 | 46.9 | 0 | 2.7 | |
| | | | 21 | 24.0 | 72.3 | 0 | 3.7 | |
| 6 | 1% Pd/C Catalyst of Example 3 | 0.0001 | 1 | 95.0 | 1.8 | 0 | 3.2 | 72.5% |
| | | | 2 | 89.8 | 7.1 | 0 | 3.1 | |
| | | | 3 | 79.9 | 16.7 | 0 | 3.5 | |
| | | | 4 | 71.2 | 24.9 | 0 | 3.9 | |
| | | | 5 | 65.8 | 31.5 | 0 | 2.7 | |
| | | | 6 | 60.9 | 35.5 | 0 | 3.6 | |
| | | | 7 | 57.9 | 38.1 | 0 | 3.9 | |
| | | | 21 | 27.4 | 71.4 | 0 | 1.1 | |

As shown in the test runs above, the catalyst of Examples 2 and 3, which were manufactured according to the present invention, perform significantly better than the catalyst of comparative Example 1. Sine the catalysts from Example 1, 2, and 3 all have the same metal loading, the improved reaction rates for the catalyst of the present invention appear to be the result of greater nonparticle dispersion. This conclusion is further supported by the TEM images shown in FIGS. 1-3. The rate increase achieved by the catalyst of the present invention can significantly reduce the time and cost of performing catalytic reaction that use particulate catalyst.

The catalyst of the present invention can be used to carry out many other Suzuki type reactions and reactions other than Suzuki reactions. For example the catalyst manufactured according to the present invention can be used in hydrogenation reactions, fuel cells, reforming catalysts, and any other reaction where a particulate catalyst can be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for manufacturing a supported nanocatalyst having highly dispersed catalyst nanoparticles anchored to a support, comprising:
   forming an intermediate supported catalyst, the steps comprising:
   (i) providing a solution comprising a plurality of catalyst atoms;
   (ii) providing a solution comprising a plurality of anchoring agent molecules, the anchoring agent molecules each having at least two functional groups, wherein at least one functional group is capable of bonding with the catalyst atoms and another functional group is capable of bonding with a support material;

(iii) treating a support material with the solution of anchoring agent molecules such that the anchoring agent molecules bond with the support; and (iv) reacting the catalyst atoms with the anchoring agent molecules; and drying the intermediate supported catalyst while maintaining the temperature during drying below about 95° C., wherein the catalyst atoms agglomerate to form nanoparticles with an average particle size of less than about 20 nm, and the supported nanocatalyst comprises highly dispersed catalyst nanoparticles anchored to the support material.

2. A method as in claim 1, wherein the temperature during drying is maintained below about 80° C.

3. A method as in claim 1, wherein the temperature during drying is maintained below about 65° C.

4. A method as in claim 1, wherein the temperature during drying is maintained below about 50° C.

5. A method as in claim 1, wherein the supported nanocatalyst is not exposed to a temperature greater than about 150° C. prior to use in catalyzing a reaction.

6. A method as in claim 1, wherein step (iv) is performed before step (iii).

7. A method as in claim 1, wherein step (iv) is performed before step (iv) and, between steps (iii) and (iv), the method further comprises removing the solvent from the solution of anchoring agent molecules.

8. A method as in claim 1, wherein during the drying process the catalyst atoms become anchored to the support.

9. A method as in claim 1, wherein the support material is selected from the group consisting of carbon black, graphite, silica, alumina, zeolites, metal oxides, polymers, and combinations thereof.

10. A method as in claim 1, wherein the solution of catalyst atoms and the solution of anchoring agent molecules comprise a solvent selected from the group consisting of water, methanol, ethanol, n-propanol, isopropyl alcohol, acetonitrile, acetone, tetrahydrofuran, dimethylformamide, dimethylsulfoxide, methylene chloride, and combinations thereof.

11. A method as in claim 1, wherein the functional group capable of bonding with the support material comprises at least one member selected from the group consisting of a hydroxyl, a carboxyl, a carbonyl, an amine, an amide, a nitrile, a nitrogen with a free lone pair of electrons, an amino acid, a thiol, a sulfonic acid, a sulfonyl halide, an acyl halide, and combinations thereof, the supported catalyst including a bond between the support material and the anchoring agent molecules formed by reacting the functional group capable of bonding with the support material with a bonding site on the support material.

12. A method as in claim 1, wherein the anchoring agent molecules comprise at least one member selected from the group consisting of oxalic acid, malic acid, malonic acid, maleic acid, succinic acid, glycolic acid, lactic acid, glucose, citric acid, EDTA, pectins, cellulose, ethanolamine, mercaptoethanol, 2-mercaptoacetate, glycine, sulfobenzyl alcohol, sulfobenzoic acid, sulfobenzyl thiol, sulfobenzyl amine, polyacrylates, polyvinylbenzoates, polyvinyl sulfate, polyvinyl sulfonates, polybisphenol carbonates, polybeuzimidizoles, polypyridine, and sulfonated polyethylene terephthalate.

13. A method as in claim 1, wherein upon forming the intermediate supported catalyst, the anchoring agent molecules are covalently bonded to the support material so as to anchor or tether at least a portion of the catalyst atoms to the support material.

14. A method as in claim 1, wherein the anchoring agent molecules are selected such that they covalently bond with the catalyst atoms in step (iv).

15. A method as in claim 1, wherein following drying the intermediate supported catalyst, the method further comprises reducing the catalyst nanoparticles to a lower oxidation state.

16. A method for manufacturing a supported nanocatalyst having highly dispersed catalyst nanoparticles anchored to a support, comprising:

providing a plurality of catalyst atoms, each catalyst atom being bonded to at least one organic anchoring agent molecule having a carbon backbone, the organic anchoring agent molecule having a functional group available for bonding with a support material;

forming an intermediate supported catalyst by dispersing the catalyst atoms and anchoring agent molecules on a support using a solvent; and anchoring the catalyst atoms to the support by removing the solvent, maintaining the temperature of the intermediate supported catalyst below about 95° C. wherein during solvent removal and anchoring the catalyst atoms agglomerate to form nanoparticles with an average particle size of less than about 20 nm.

17. A method as in claim 16, wherein the temperature during removal of the solvent and anchoring of the catalyst atoms is maintained below about 80° C.

18. A method as in claim 16, wherein the temperature during removal of the solvent and anchoring of the catalyst atoms is maintained below about 65° C.

19. A method as in claim 16, wherein the supported nanocatalyst is not exposed to a temperature greater than about 150° C. prior to use in catalyzing a reaction.

20. A method as in claim 1, wherein following removing the solvent, the method further comprises reducing the catalyst nanoparticles to a lower oxidation state.

* * * * *

UNITED STATES PATENT AND TRADEMARK OFFICE
CERTIFICATE OF CORRECTION

PATENT NO. : 7,396,795 B2  
APPLICATION NO. : 11/216442  
DATED : July 8, 2008  
INVENTOR(S) : Reyes et al.

Page 1 of 1

It is certified that error appears in the above-identified patent and that said Letters Patent is hereby corrected as shown below:

Column 5
Line 63, before "broadly" delete the first instance of "can be"

Column 6
Line 66, change "particles" to --particle--

Column 7
Line 28, after "making" add --a--

Column 9
Line 23, change "it" to --,--

Column 10
Line 28, change "Sine" to --Since--
Line 28, change "Example" to --Examples--
Line 38, after "For Example" add --,--

Signed and Sealed this

Seventeenth Day of February, 2009

JOHN DOLL
*Acting Director of the United States Patent and Trademark Office*